United States Patent
Khayat et al.

(10) Patent No.: US 7,372,240 B2
(45) Date of Patent: May 13, 2008

(54) OUTPUT LOAD ADAPTABLE MOSFET GATE DRIVE VOLTAGE LEVEL IN A DC-DC CONTROLLER

(75) Inventors: Joseph Khayat, Bedford, NH (US); Aditya Makharia, Manchester, NH (US); Timothy Goodrow, Ayer, MA (US); David Olson, Chelmsford, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/616,414

(22) Filed: Dec. 27, 2006

(65) Prior Publication Data

US 2008/0061757 A1    Mar. 13, 2008

Related U.S. Application Data

(60) Provisional application No. 60/824,872, filed on Sep. 7, 2006.

(51) Int. Cl.
*G05F 1/575* (2006.01)
*G05F 1/618* (2006.01)

(52) U.S. Cl. .................................... 323/283; 323/284
(58) Field of Classification Search ............... 323/265, 323/271, 282, 283, 284, 351
See application file for complete search history.

(56) References Cited

U.S. PATENT DOCUMENTS 6,166,527 A * 12/2000 Dwelley et al. ............ 323/222

* cited by examiner

*Primary Examiner*—Gary L. Laxton
(74) *Attorney, Agent, or Firm*—Wade J. Brady, III; Frederick J. Telecky, Jr.

(57) ABSTRACT

The output current of a fixed-frequency DC to DC converter is sensed, creating a voltage representative of the load current. This voltage is then compared to one or more threshold voltages using a plurality of comparators, creating a plurality of logic signals indicative of which of a plurality of ranges the output current falls within. These logic signals are coupled to a multiplexer which decodes the logical inputs to one-of-n and selects one gate drive voltage from a plurality of such voltages, each optimized for its corresponding current range. The selected gate drive voltage is then used as the gate drive in a known art DC to DC converter, thereby increasing efficiency over a wide range of output current.

13 Claims, 3 Drawing Sheets

OUTPUT LOAD ADAPTABLE MOSFET GATE DRIVE VOLTAGE LEVEL IN A DC-DC CONTROLLER

CROSS-REFERENCE TO RELATED APPLICATIONS

This application claims the benefit of U.S. Provisional Application No. 60/824,872, filed Sep. 7, 2006.

BACKGROUND OF THE INVENTION

1. Field of the Invention

This invention relates generally to DC to DC voltage conversion, and more specifically to increasing the efficiency of such conversion by optimizing the MOSFET gate drive signal of a switching DC to DC converter as a function of output voltage load current.

2. Description of the Related Art

Conversion of direct current (DC) voltage from one voltage level to another is a common requirement in many electronic systems. One type of voltage converter is referred to as dissipative, wherein a voltage Vin higher than the desired output voltage Vout is applied to a first input terminal of a pass transistor, while a second output terminal of the pass transistor is connected to the load to be driven at voltage Vout. The output voltage applied to the load is sampled, scaled, and compared to a reference voltage, developing an error signal which then drives a third control terminal of the transistor in such a manner as to cause the scaled output voltage to become very close to the desired reference voltage, even with variation in Vin and/or current Iout drawn by the load. The current through the pass transistor in a dissipative converter is typically constant and substantially equal to the load current. One disadvantage of the dissipative converter is that significant power, approximated by $P=Iout*(Vin-Vout)$, is dissipated in the pass transistor, creating undesired heat and inefficiency.

A preferred type of voltage converter has become the switching converter, wherein the pass transistor is rapidly switched on and off to control the current flow to the load, hence voltage applied to the load. A switching converter having an output voltage lower than its input voltage is commonly referred to as a buck converter, while one having an output voltage higher than the input voltage is referred to as a boost converter. The ability of the switching converter to boost an input voltage to a higher level is another advantage over the dissipative converter. The efficiency of a switching converter is also typically much higher than a dissipative converter, especially in applications having a large difference between input and output voltages.

In operation, a switching converter samples and scales the output voltage and compares this scaled voltage to a reference voltage, developing an error signal. This error signal then modulates the width of a pulse-width-modulated signal which drives the control terminal of the pass transistor, for example the gate if the pass transistor is a MOSFET. The gate drive signal causes the typical enhancement-mode MOSFET to have a very low drain to source resistance during the gate drive high state, and a very high resistance during the gate drive low state. By controlling the relative on/off time of the pulse-width-modulated gate drive, the amount of average current flowing through the pass transistor to the load is adjusted to drive the output (load) voltage to the desired value. As the input voltage decreases, increasing on time of the gate drive keeps the output voltage at the desired level. Conversely, increasing input voltage causes a decrease in on time. The frequency of the gate drive signal is typically in the hundreds of kilohertz to many megahertz range.

Ideally, the pass transistor in a switching converter is either fully on, in which case its ideal resistance is zero, or fully off, in which case its ideal current flow is zero. In both ideal cases, no energy is lost in the pass transistor. Available non-ideal pass transistors, however, have non-zero on resistance Rds(on), where Rds refers to the drain to source resistance of a metal-oxide field-effect transistor (MOSFET). This non-zero Rds(on) leads to conduction loss, increasing with increasing load current. Because Rds(on) is reduced as the gate voltage is increased in an enhancement-mode MOSFET, conduction loss may be reduced by driving the gate at a higher voltage. However, the MOSFET gate capacitance must be charged or discharged at each transition. For a given gate capacitance, gate charge time increases with increasing gate voltage. As the transition times of the pass transistor become a significant fraction of the total switching signal period, the switching losses due to gate charging/discharging increase substantially.

It is desirable therefore to optimize the gate drive voltage dependent on output current, keeping the gate drive voltage as low as practical while still achieving low Rds(on). At heavy load currents, efficiency degradation is dominated by MOSFET conduction losses due to non-zero Rds(on), so it is advantageous to apply a higher gate drive voltage to decrease Rds(on). At lighter load currents, switching losses due to gate capacitance dominate, so it is advantageous to apply a lower gate drive voltage, reducing the charge and discharge times of the gate.

SUMMARY OF THE INVENTION

The invention provides a method and apparatus for automatically optimizing the gate drive voltage in a constant-frequency switching DC to DC converter dependent on output load current.

In an embodiment of the invention described in greater detail below, load current flows through a current sensing resistor, generating a voltage proportional to load current. This voltage is compared to a plurality of voltage ranges by a plurality of comparators, for example ranges representing load currents of less than 30% of max, 30-60% of max, and over 60% of max. The outputs of the comparators are logically decoded into selection signals for a multiplexer. The multiplexer inputs are coupled to a plurality of gate drive voltages, one of which is selected depending on the selection signals, thereby coupling the selected voltage to the multiplexer output. Depending into which range the load current falls, a gate drive voltage appropriate to that current range is thus selected from a plurality of voltages, and applied to the gate drive circuitry.

As further described below, the disclosed embodiments provide a combination of desirable properties not available in the known art, including a means of optimizing the gate drive voltage which in turn increases efficiency of the switching voltage converter. Another advantage is the ability to tailor the gate drive voltages to MOSFETs having different enhancement characteristics.

Further benefits and advantages will become apparent to those skilled in the art to which the invention relates.

DESCRIPTION OF THE VIEWS OF THE DRAWINGS

Example embodiments of the invention are described below with reference to the accompanying drawings, wherein.

Throughout the drawings, like elements are referred to by like numerals.

DETAILED DESCRIPTION

Figure 1:
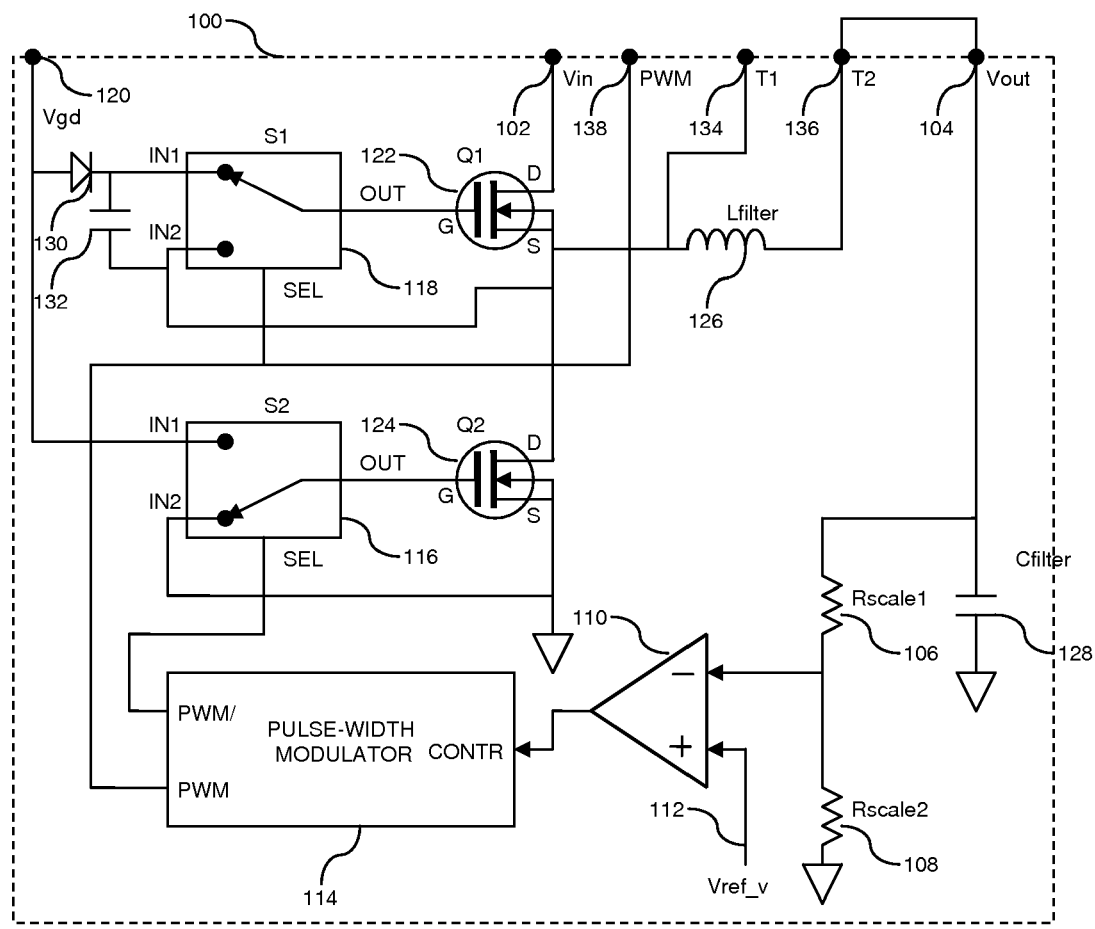
FIG. 1 (prior art) is a block diagram of a representative known art switching DC to DC converter.

In FIG. 1, a block diagram of a known DC to DC converter 100, a first end of resistor Rscale1 106 is connected to the output terminal Vout 104, and a second end of resistor Rscale1 106 is connected to a first end of resistor Rscale2 108 and the inverting input of amplifier 110. The second end of resistor Rscale2 108 is coupled to ground. The non-inverting input of amplifier 110 is coupled to a reference voltage Vref_v 112. The output of amplifier 110 is coupled to the control input CONTR of pulse-width modulator 114. The pulse width modulator 114 has two outputs, PWM and a substantially equal but inverted signal PWM/. The output PWM of pulse-width modulator 114 is coupled to the select input SEL of switch S1 118 and to terminal PWM 138. A gate drive voltage input Vgd 120 is coupled to the anode of diode 130 and input IN1 of switch S2 116. The cathode of diode 130 is coupled both to a first end of capacitor 132 and the input IN1 of switch S1 118. A second input IN2 of S1 118 is coupled to a node also including the second end of capacitor 132, the source S of first transistor Q1 122, the drain D of a second transistor Q2 124, terminal T1 134, and a first end of inductor Lfilter 126. The drain D of first transistor Q1 122 is coupled to terminal Vin 102. The second end of inductor Lfilter 126 is connected to terminal T2 136. A wire couples terminal T2 136 to Vout 104. A first terminal of capacitor Cfilter 128 is connected to Vout 104, and a second end of capacitor Cfilter 128 is connected to ground. The output OUT of S1 118 is coupled to the gate G of transistor Q1 122, typically an enhancement-mode field effect transistor. The output PWM/ of pulse-width modulator 114 is connected to the select input SEL of switch S2 116; a first input IN1 of S2 116 is connected to a gate drive voltage Vgd 120 and the anode of diode 130; a second input IN2 of S2 116 is connected to the source S of second transistor Q2 124 (typically an enhancement-mode field effect transistor) and ground. The output OUT of switch S2 116 is connected to the gate G of transistor Q2 124. The drain D of the second transistor Q2 124 is connected as described above to the node including the source S of Q1 122.

In operation, an input voltage Vin is applied to terminal Vin 102, and an output voltage Vout at terminal 104 is coupled to a load. The voltage Vout at 104 is scaled (divided) by resistors Rscale1 106 and Rscale2 108 such that, when Vout is at the desired nominal output voltage, the voltage at the inverting input of amplifier 110 is substantially equal to the reference voltage Vref_v at the non-inverting input of amplifier 110. When the output voltage Vout differs from its nominal voltage, the difference between the scaled representation of Vout and reference Vref_v is amplified by amplifier 110, having its output coupled to the control input CONTR of pulse-width modulator 114. The frequency of the waveform generated in pulse width modulator 114 is substantially constant, while the duty cycle (percentage of the period in a logical high state) of pulses varies responsive to the control input CONTR. The duty cycle of output PWM increases as Vout increases and decreases as Vout decreases.

During the logical high of output PWM, which controls the state of switch S1 118, the complementary output PWM/, which controls the state of switch S2 116, is low, causing switch S2 to couple the gate of Q2 124 to ground, cutting off current flow in Q2 124. Concurrently, switch S1 118 couples the end of capacitor 132 at IN1 of S1 118 to the output OUT of S1 118 and to the gate G of transistor Q1 122, typically an enhancement-mode field effect transistor. The other end of capacitor 132 is coupled to the source of transistor 122. As described in the next paragraph, capacitor 132 has been charged to a voltage approximating gate drive voltage Vgd during the previous logical low portion of PWM, thus providing a gate to source voltage for transistor Q122. During this logical high of PWM, transistor Q1 122 is thus turned on and provides a very low resistance from drain D to source S, allowing flow of current from Vin at terminal 102 to Vout at terminal 104 through inductor Lfilter 126.

When the logical high state of PWM ends, a logical low state is entered. During the logical low of output PWM, the gate G and source S of Q1 122 are coupled together through S1 118, which is now in the IN2 position, thereby causing Q1 122 to be cut off and enter a high-resistance state. Concurrently, PWM/ is in a logical high state, causing switch S2 to be in its IN1 position, coupling the gate of transistor Q2 124 to Vgd 120 through S2 116. Transistor Q2 124 is thus turned on by gate drive Vgd 120, and provides a very low resistance from drain D to source S of Q2 124. The second end of capacitor 132 is thus coupled through transistor 124 to ground, while the first end of capacitor 132 is coupled through diode 130 to the gate drive voltage Vgd. Capacitor 132 is thereby charged to a voltage approximating Vgd minus a diode drop.

The complementary switching of transistors Q1 and Q2 thereby modulates the flow of current through inductor Lfilter 126 to Vout 104, which modulates the voltage at Vout according to Ohm's law. When the voltage Vout drops below the nominal value, the operation described above causes an increase in current, thus raising the voltage. Conversely, when the voltage Vout rises above the nominal value, a decrease in current through Lfilter 126 decreases the voltage Vout. A voltage Vin at terminal 102 is thus reduced to a lower voltage Vout at terminal 104, and Vout is driven to its desired voltage by the action of the feedback loop described above.

Figure 2:
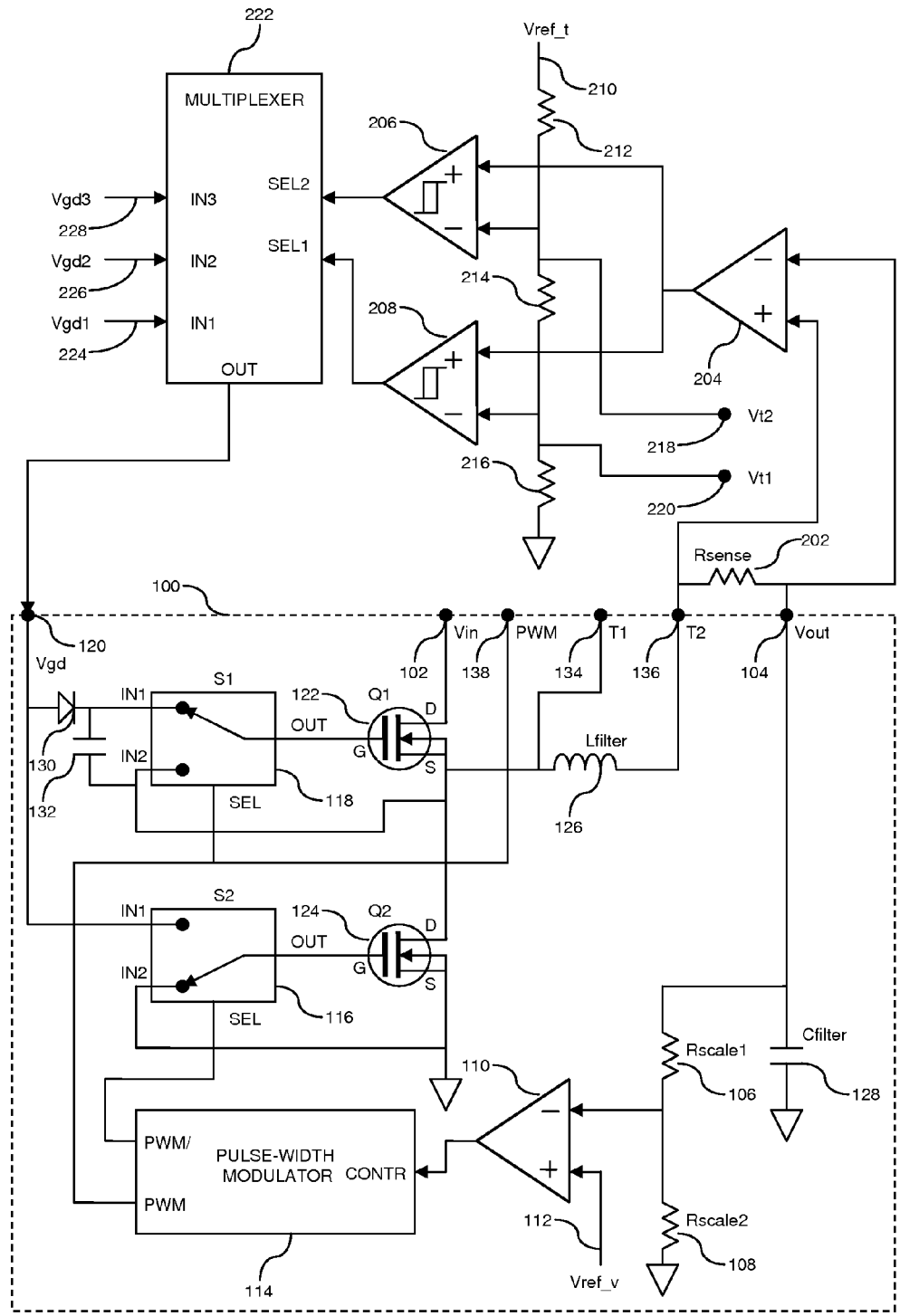
FIG. 2 is a block diagram of a switching DC to DC converter having gate drive voltage selected from a plurality of voltages, responsive to output load current.

In FIG. 2, circuitry configured in a novel manner is added to the converter of FIG. 1, facilitating modifying the gate drive voltage Vgd as the load current at Vout changes.

A resistor Rsense 202 replaces the wire coupling terminal T2 136 and Vout 104 in FIG. 1. Rsense, typically having a resistance very low compared to the load resistance at output Vout 104, has a first end connected to terminal T2 136, the second end of inductor Lfilter 126, and the non-inverting input of differential amplifier 204. The second end of resistor Rsense 202 is connected to output terminal Vout 104, the first end of resistor Rscale1 106, the first end of capacitor Cfilter 128, and the inverting input of differential amplifier 204.

The output of differential amplifier 204 is coupled to the non-inverting inputs of first comparator 206 and second comparator 208. Resistor 212 has a first end connected to a reference voltage Vref_t 210, and a second end connected to the inverting input of first comparator 206, a first end of resistor 214, and a terminal Vt2 218. The second end of resistor 214 is connected to the inverting input of comparator 208, a first end of resistor 216, and terminal Vt1 220. The second end of resistor 216 is connected to a reference voltage lower than Vref_t, such as ground.

The output of comparator 208 is coupled to the select input SEL1 of multiplexer 222, and the output from comparator 206 is coupled to the select input SEL2 of multiplexer 222. A gate drive voltage Vgd1 is coupled to IN1 224 of multiplexer 222; gate drive voltage Vgd2 is coupled to IN2 226, and gate drive voltage Vgd3 is coupled to IN3 228. The output OUT of multiplexer 222 is coupled to the gate drive input Vgd 120 of the known DC-DC converter as described in FIG. 1.

In operation, load current flowing through Rsense 202 produces a voltage drop across resistor Rsense 202 substantially proportional to current. The voltage generated across Rsense 202 is amplified in differential amplifier 204 and the amplified voltage is coupled to the non-inverting inputs of first comparator 206 and second comparator 208. The resistive ladder comprising resistors 212, 214, and 216 divides reference voltage Vref_t into a plurality of threshold voltages which are applied to the plurality of comparators, each voltage threshold corresponding to a desired output load current threshold level. At load currents below that corresponding to the first threshold voltage at the inverting input of comparator 208, comparator 208 and comparator 206 both have a logic low output. For load currents causing the voltage out of amplifier 204 to be greater than the voltage at the inverting input of comparator 208 but less than the voltage at the inverting input of comparator 206, comparator 208 output is logical high while comparator 206 output is logical low. For load currents causing the voltage out of amplifier 204 to be greater than the voltage at the inverting input of comparator 208 and greater than the voltage at the inverting input of comparator 206, comparator 208 output and comparator 206 output are both logical high. The outputs of comparators 206 and 208 thus indicate which of a plurality of ranges the load current falls within. Comparators 206 and 208 incorporate hysteresis to reduce undesired rapid switching (chatter) when the input voltage is near a comparator threshold voltage.

The outputs from comparators 206 and 208, coupled to the select inputs of multiplexer 222, are decoded in multiplexer 222 such that IN1 is coupled to OUT for SEL1 and SEL2 having logical states 0, 0 respectively, corresponding to a first output current range; IN2 is coupled to OUT for SEL1 and SEL2 having logical states 1, 0 respectively, corresponding to a second output current range; IN3 is coupled to OUT for SEL1 and SEL2 having logical states 1, 1 respectively, corresponding to a third output current range. Gate drive Vgd1 at input IN1 224 is thus coupled to the output of multiplexer 222 when the load current is in the first range, Vgd2 at input IN2 226 when the load current is in the second range, and Vgd3 at input IN3 228 when the load current is in the third range.

The gate drive voltage applied to the converter of FIG. 1 is thus chosen from a plurality of gate drive voltages, depending on which of a plurality of ranges the load current falls within. By choosing a gate drive Vgd1 which is lower in voltage than Vgd2 or Vgd3, and applying it when the load current is in its first (lowest) range, the dominant switching losses may be minimized. Conversely, when load current is in its highest range, a gate drive Vgd3 is chosen which is higher than Vgd1 or Vgd2, to minimize the dominant conduction losses at the high load current. One or more intermediate current ranges and gate voltages may be applied as described above, but significant efficiency improvement is achieved even with a single threshold, two current ranges, and two gate drive voltages.

Figure 3:
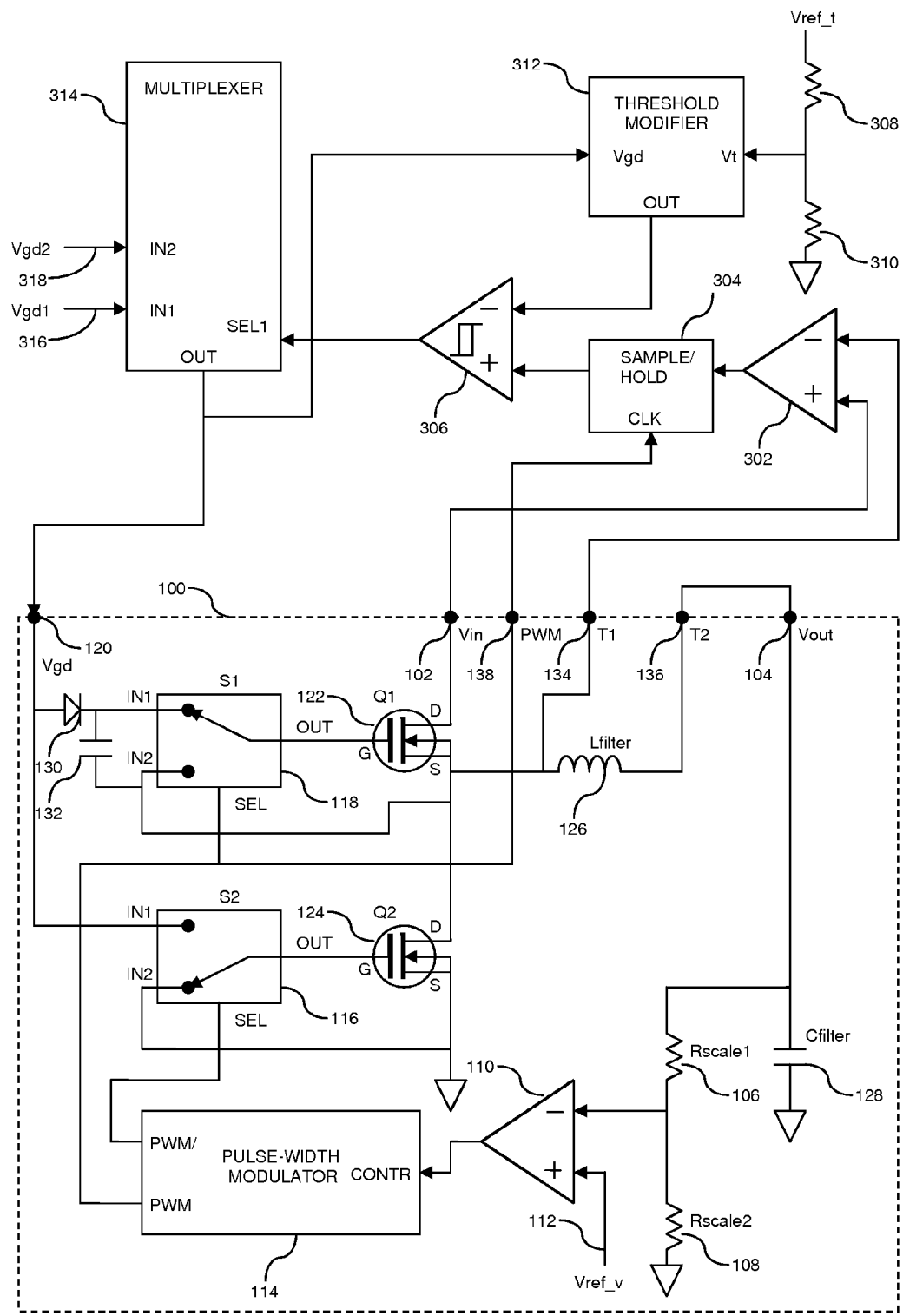
FIG. 3 is a block diagram of a switching DC to DC converter having gate drive voltage selected from a plurality of voltages, responsive to output load current sensed by voltage drop across Rds(on) of switching MOSFET.

In FIG. 3, circuitry configured in a novel manner is added to the converter of FIG. 1, in yet another embodiment facilitating modifying the gate drive voltage Vgd as the load current at Vout changes, using the Rds(on) of the switching transistor rather than a separate current sense resistor as in the circuit described in FIG. 2.

Current sense resistor Rsense 202 of FIG. 2 is omitted, being replaced by a wire connecting terminal T2 136 and Vout 104 as in FIG. 1. The non-inverting input of an amplifier 302 is connected to Vin 102, and thereby also to the drain of output transistor Q1 122. The inverting input of amplifier 302 is connected to terminal T1 134 and thereby to the node including the source of output transistor Q1 122. A voltage proportional to current through Q1 122 is developed across the non-zero drain to source resistance of this transistor Q1 122, which is proportional to output current at Vout 104. The output of amplifier 302 is coupled to the input of sample/hold 304. The trigger input of sample/hold 304 is coupled at terminal PWM 138 to the PWM signal of the known converter of FIG. 1. The output of sample/hold 304 is coupled to the non-inverting input of the comparator 306. The inverting input of comparator 306 is coupled to the output OUT of threshold modifier 312, and the output of comparator 306 is coupled to the select input SEL1 of multiplexer 314. A first end of resistor 308 is coupled to the reference voltage Vref_t; a second end of resistor 308 is coupled both to a first end of resistor 310 and input Vt of threshold modifier 312. A first gate drive voltage Vgd1 is coupled to IN1 316 of multiplexer 314, and a second gate drive voltage Vgd2 is coupled to IN2 318 of multiplexer 314. The output OUT of multiplexer 314 is coupled both to the input Vgd of threshold modifier 312 and the Vgd input 120 of the converter of FIG. 1.

In operation, pulse width modulator 114 provides, in a known manner, substantially complementary signals PWM and PWM/ at a nominal frequency. During the high state of PWM as described above, current flows to the load through transistor Q1 122. Because the drain-source resistance Rds (on) is non-zero, a voltage is developed between the drain and source proportional to current flow. This voltage is amplified in differential amplifier 302. During the low state of PWM, transistor Q1 is cutoff, and the drain-source voltage is no longer representative of the output current. The voltage out of amplifier 302 therefore is indicative of current only during the time PWM is high, turning on transistor Q1. Sample/hold 304 is triggered during this time by signal PWM or a substantially equivalent signal, causing sample/hold 304 to hold the voltage indicative of output current. This voltage is coupled to one input of comparator 306, while the other input of comparator 306 is at a modified threshold voltage from threshold modifier 312. If the held voltage indicative of output current is above this modified threshold voltage, the output of comparator 306 goes to a high state for the next period of PWM. Comparator 306 incorporates hysteresis to reduce undesired rapid switching (chatter) when the input voltage is near the comparator threshold voltage. When the output of comparator 306 goes high, multiplexer 314 couples Vgd2 318 to the Vgd input 120 of the converter of FIG. 1.

Threshold modifier 312 has as a first input a voltage Vt set by Vref_t and the resistive divider comprising resistors 308 and 310. The second input of threshold modifier 312 is gate drive voltage Vgd as applied to converter 100. Circuitry within threshold modifier 312 modifies the voltage Vt as a function of Vgd, thereby compensating for the change in the drain-source on resistance of transistor 122 as a function of gate drive voltage.

It should also be understood that the use of Vdd, Vref, ground, etc., are illustrative only, and that implementations using dual power supplies and the like are equally possible. Moreover, reference voltages developed either internal to the circuit or external to the circuit will suffice.

Those skilled in the art to which the invention relates will appreciate that yet other substitutions and modifications can be made to the described embodiments, without departing from the spirit and scope of the invention as described by the claims below. Alternative forms of hysteresis may be employed to preclude instability when the load current is substantially equal to one of the threshold levels. The number of threshold levels may be changed as appropriate. Many other alternatives to the circuits and sub circuits described are possible while retaining the scope and spirit of the invention.

What is claimed is:

1. An apparatus for selecting a gate drive voltage, as used in a DC to DC converter, from a plurality of gate drive voltages, responsive to the load current at the output of the converter, comprising:
    a current sense resistor in series with the path of output current flow, across which is generated a voltage proportional to output current
    an amplifier coupled to said sense resistor, whereby said voltage proportional to output current is amplified;
    a plurality of comparators, each having as a first input the amplified voltage indicative of output current, each having as a second input one of a plurality of reference voltages corresponding to a plurality of current threshold levels, whereby the logical outputs from the plurality of comparators are indicative of which of the plurality of current ranges the output current falls within;
    a multiplexer having select inputs coupled to said outputs from said plurality of comparators, having inputs coupled to a plurality of gate drive voltages, and having an output which is coupled to one of the plurality of said inputs responsive to the plurality of select inputs, said output also being coupled to the gate drive input of a known DC to DC converter;
    whereby the multiplexer output is a gate drive voltage dependent on output current, and whereby each of the plurality of voltages is chosen to optimize efficiency in the corresponding current range.

2. The apparatus of claim 1, wherein a single comparator and threshold generate a signal indicative of which of two ranges output current falls within.

3. The apparatus of claim 1, wherein the plurality of reference voltages are generated by a resistive ladder.

4. The apparatus of claim 1, wherein the multiplexer includes decoding logic between the outputs of the plurality of comparators, more than one of which may be logically high depending on output current level, and the select inputs of the multiplexer, such that a one at a time of the plurality of multiplexer inputs is coupled to the multiplexer output.

5. The apparatus of claim 1, wherein the inverting inputs of one or more of the plurality of comparators are coupled to one or more terminals accessible from outside the circuit, so as to allow modification of internal reference voltages by externally applied voltages.

6. The apparatus of claim 1, wherein the current sense resistor is omitted, and said voltage proportional to output current is generated across the internal drain to source resistance of one of the output transistors.

7. The apparatus of claim 6, further comprising;
    a differential amplifier to increase the level of said voltage proportional to output current;
    a sample/hold circuit which samples the output of said differential amplifier during the time the transistor across which said voltage is generated is in a conducting or "on" state, and which holds the voltage otherwise;
    a comparator having as a first input the held voltage from said sample/hold, having a second input which is a threshold voltage, and having an output responsive to the relative voltages at said first and second inputs;
    a multiplexer having a select input coupled to the output of said comparator, such that a first or second gate drive voltage Vgd1 or Vgd2 is selected and coupled to the multiplexer output, dependent on output current.

8. The apparatus of claim 7, further comprising a threshold modifier circuit which has as a first input a reference threshold voltage Vt, and as a second input the gate drive voltage Vgd at the output of said multiplexer, such that the voltage output from the threshold modifier is a function of Vgd and is used as said second threshold input of said comparator;
    thereby compensating for changes in said internal drain to source resistance of the transistor as a function of drain current.

9. The apparatus of claim 7, further comprising a plurality of comparators and a plurality of threshold voltages.

10. A method for selecting, responsive to the output current of a DC to DC converter, a gate drive voltage for the output transistor of said converter from a plurality of such gate drive voltages, comprising the following steps:
    measuring a voltage across a resistor in series with the output current of the converter, said voltage being responsive to and proportional to the output current;
    comparing said voltage to a plurality of threshold voltages to generate a plurality of logic level outputs indicative of output current;
    decoding said logical outputs to a format suitable for controlling the select inputs of a 1 of N multiplexer;
    applying a plurality of gate drive voltages to the plurality of inputs of said multiplexer;
    coupling the output of said multiplexer to the gate drive input of a known DC to DC converter;
    whereby the gate drive voltage is modified as output current changes, so as to increase the efficiency of the converter.

11. The method of claim 10, wherein said resistor is omitted, and wherein:
    the voltage responsive to and proportional to the output current is measured across the drain to source on resistance of the output transistor.

12. The method of claim 11, wherein a sample/hold having said voltage at its input is triggered at the PWM rate, and holds said voltage;
    whereby said voltage across the drain to source on resistance of the output transistor, which is representative of output current while current is flowing though said transistor, is sampled during such current flow time, and held during time of reduced current flow.

13. the method of claim 10, wherein said comparing step is followed by:
- logically comparing the logical outputs resulting from said comparing step with the sets of outputs from a plurality of consecutive prior comparing steps;
- determining whether the current set of outputs matches that of the immediately prior M sets of outputs;
- if true, the current set of outputs is coupled to said multiplexer select inputs;
- if false, the state of the multiplexer select inputs is not changes;
- whereby a change to a different gate drive voltage occurs after M periods having the same set of comparator outputs;
- and whereby transient changes in comparator outputs lasting less than M periods cause no change to gate drive voltage selection.

* * * * *